United States Patent [19]

Lewis

[11] 3,999,358
[45] Dec. 28, 1976

[54] CLOSURE OF POLYETHYLENE OXIDE FILM

[75] Inventor: Paul A. Lewis, Salinas, Calif.
[73] Assignee: Union Carbide Corporation, New York, N.Y.
[22] Filed: Jan. 21, 1975
[21] Appl. No.: 542,708
[52] U.S. Cl. .................................. 53/28; 156/308; 156/334
[51] Int. Cl.² .......................................... B65B 9/06
[58] Field of Search ...................... 53/28, 180, 177; 156/308, 334, 330; 47/56

[56] References Cited
UNITED STATES PATENTS

| | | | |
|---|---|---|---|
| 3,561,187 | 2/1971 | Rohnert et al. | 53/28 |
| 3,683,583 | 8/1972 | Cochran et al. | 53/180 X |
| 3,811,980 | 5/1974 | Roderhoff | 156/308 |

OTHER PUBLICATIONS

"Polyethers High Polymers" Part I Polyalkylene Oxides and Other Polyethers, edited by Norma G. Gaylord, 1963, Library of Congress No. 62-15824, pp. 213, 214.

*Primary Examiner*—Leon Gilden
*Attorney, Agent, or Firm*—Owen, Wickersham & Erickson

[57] ABSTRACT

Polyethylene oxide film is sealed upon itself, by first spraying it with an aqueous solution essentially of polyethylene oxide and then pressing one sprayed portion upon another. The invention is especially useful in making seed tape having low moisture content.

12 Claims, 1 Drawing Figure

U.S. Patent  Dec. 28, 1976  3,999,358
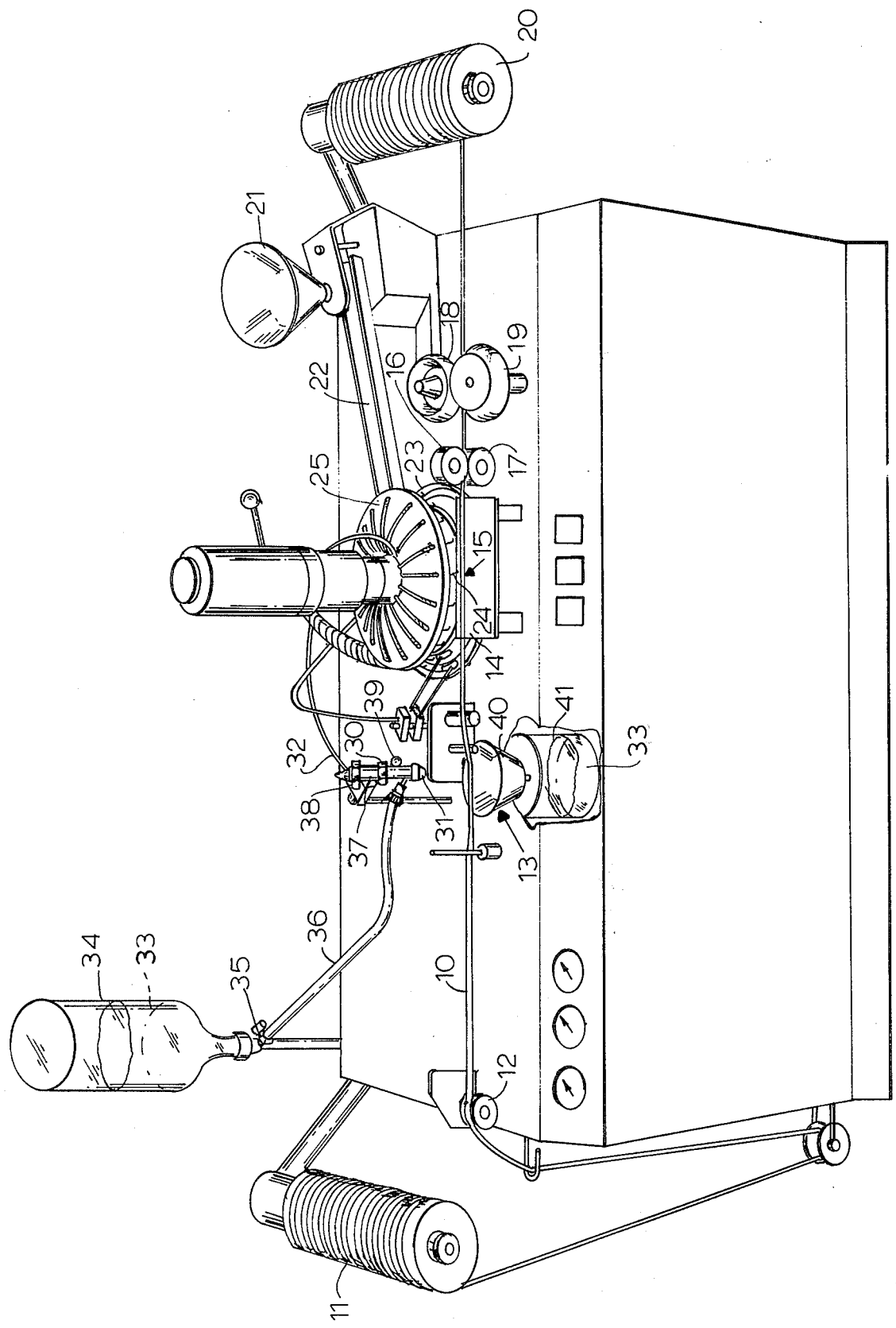

CLOSURE OF POLYETHYLENE OXIDE FILM

BACKGROUND OF THE INVENTION

The invention relates to the manufacture of seed tape and also to the closure of polyethylene oxide film upon itself.

Seed tape is made commercially from polyethylene oxide film. This film, though essentially polyethylene oxide, may contain some additional materials (plasticizer, stabilizer, antioxidant, dye, etc.). The film, in order to be operative, is readily water soluble. Advantage of this fact has been taken in sealing the tape after the seeds have been deposited thereon, usually while the tape is formed into a troughed shape. Thus, before the seed is deposited, the tape has been moistened with water, as by spraying water thereon or by applying it from a felted moistener. Then, after the seed has been deposited, the tape is closed on itself under pressure, sealing the tape and enclosing the seed.

An important problem, heretofore unsolved, has been proper control of the amount of moisture imparted to the tape in order to cause its sealing. Excessive moisture has bad effects on both the seed and the tape.

Many seeds are quite sensitive to moisture; an excess of moisture can prematurely trigger the germination process and may result in killing the seed. Seeds which can last for many months if kept in an atmosphere that is sufficiently dry may last only a few weeks if the moisture level is a little higher.

The tape itself is sensitive to the applied moisture, though generally insensitive to atmospheric humidity. The tape is water soluble; so obviously the applied moisture used for sealing must be kept below an amount that would simply dissolve the tape. But that is not all. Tape that becomes much too wet turns milky and tends to stick to itself when wound on a roll, so that it cannot be unwound satisfactorily. Even when not wet to that degree, over-moistened tape tends to stretch while wet--i.e., when the seeds are being put in and the tape sealed-- and then to shrink when it dries, after being wound on a reel. Such shrinking can break some delicate seeds and is generally hard on the strength of the tape. If a stretched wet tape is wound tautly on a card, as is common in certain packaging methods, the card will be bowed in along an arc as the tape dries and shrinks.

Several variables make it difficult to control the amount of moisture used. Each thickness and width of polyethylene oxide tape results in somewhat different requirements as to the amount of moisture needed for sealing. Each size of seed and the spacing between seeds also affects the amount of moisture needed for sealing the film. It should be noted that it is not sufficient simply to seal the film along its edges where it laps over; it is also important that the film between adjacent seeds be sealed, in order to retain the spacing between the seeds and hold them in position.

Moreover, the seed tape is difficult to dry once it is too moist. The tape travels at high speeds, typically several thousand feet per hour, during the manufacturing operation of emplacing the seed and closing the tape. These high speeds make it difficult to dry the tape. High temperatures cannot be used to shorten the drying time, because of the low melting temperature of the plastic, because excessive temperature may damage the seed directly, and also because the creation of water vapor within the sealed tape, which results from heating, causes the tape to balloon and to form a hollow tube, with no sealing between seeds. Consequently, drying must be done at a moderate rate that allows time for the moisture to diffuse out through the tape. Adequate drying in this manner requires a drying chamber in which the tape is dried for at least thirty seconds, and this means several hundred feet of tape travel. Drying chambers as large as this would hamper the production operation, and shorter chambers are inadequate.

At this point, it may be said that there is no easy inexpensive way to measure either the amount of moisture being applied or the amount of moisture remaining in the finished tape. As to the amount applied, when it is sprayed, some evaporates, so that the excess collected does not express by mere subtraction from the amount sprayed how much stayed on the tape. Tests have shown that the completed tape has contained between about 3 and 15 percent moisture, probably averaging around 6 to 7 percent,--a little too high for optimum results.

Experimental data have also shown that when the moisture level in the completed tape is higher than about ten percent, the germination percentage of the seed when planted may be seriously degraded by storage. Thus, if the moisture level is over ten percent for one or two weeks after sealing, gradually drying out, some seeds drop by ten to twenty percent in germination level after six months storage. Seed tapes are of advantage principally when the germination levels are quite high, approaching 100 percent. Therefore, a drop of 10 to 20 percent is undesirable.

Other solvents which can be used to seal polyethylene oxide tape are either toxic, flammable, or both.

Since the tape must be sealed, and moisture has been needed to achieve proper sealing, the problem has been extraordinarily difficult.

The purpose of the present invention is to obtain the needed sealing at present manufacturing speeds while not requiring elaborate controls, excessive drying equipment, or even elaborate inspection methods.

SUMMARY OF THE INVENTION

I have found that, in place of using water, a solution of the polyethylene oxide film in water provides a more effective sealant with less water.

The solution may be of polyethylene oxide or of a polyethylene film which may contain such other additives as may be in the film. Use of scrap film from the seed-tape manufacturing proces is quite economical and effective.

The presence of any polyethylene oxide in the water helps. Very good results are obtained from a 1 percent solution. The strength of the solution is variable over broad limits, but viscosity is an important limiting factor. It has been found that a 5 percent solution of some film, for example, is too viscous for most spraying techniques. The scrap film, being a calendered resin, with additions, may impart more viscosity than would pure polyethylene oxide.

Significant reduction in tape moistures have been achieved by using the present invention. Some of the significant results already noted will be described, and other objects and advantages of the invention will appear from the following description of a preferred embodiment of the invention as applied to the manufacture of seed tape.

BRIEF DESCRIPTION OF THE DRAWING

The drawing is a view in perspective of a seed tape manufacturing machine capable of use in practicing the present invention.

DESCRIPTION OF A PREFERRED EMBODIMENT

The manufacture of seed tape is used as the example because it affords a process having a pressing need for the invention.

Polyethylene tape 10 is unwound from a reel 11, carried by various guide wheels to a final guide wheel 12 whence it runs across a moisturizing station 13, then to a troughing form 14 where the moist tape 10 is troughed and so held while passing a seed dispensing station 15. Then, the tape 10 is closed together between a pair of closing wheels 16 and 17, pressed between two drive wheels 18 and 19 and sent to a re-reeling station 20. The seeds, fed through a vibrated hopper 21 and inclined vibrated slide 22 to a seed tray 23, are picked up, usually one at a time, by needle-like members 24 mounted on a rotating disc 24 and are dropped on the troughed and moist tape 10 at the seed-dispensing station 15. All this is well known and is explained in several issued patents. (For example, see U.S. Pat. Nos. 3,511,016, 3,555,774, 3,561,187, 3,683,583, and 3,762,127.

The tape moistening station 13 may comprise a spray device 30 having a nozzle 31. Pneumatic pressure, which may be supplied through tube 32 from a suitable source of compressed air, may be used to impel the solution through the nozzle 31. The solution itself, shown at 33, may be stored in a suitable vessel, such as the inverted bottle 34, and delivered to the nozzle 31 through an on-off valve 35 and a tube 36. A metering valve 37 at the spray device 30 is regulated by a handle 38. Atomization of the solutions is controlled by an air supply adjusting knob 39. Excess solution 33--that which neither stays on the tape 10 nor evaporates--is collected by a funnel 40, which leads to a collection vessel 41, for discard or for re-use, as desired.

Spraying with air impelling is given here as an example, but other methods of atomization by high pressure without air may be used for spraying, and the solution may be applied to the tape by other ways than by spraying. For example, the solution may be applied to the tape by a roller, a felt moistener, a doctor blade, a solid stream, and so on. Air spraying is the best mode presently known to the inventor, but the invention is not limited to this one embodiment.

The drive wheels 18 and 19 move the tape 10 through the moisture-applying station 13 and other operations, typically at several thousand feet per hour. When using the present invention, no drying equipment is needed, and the tape 10 can pass directly from the drive rolls 18 and 19 to the re-reeling mechanism 20 without waiting or drying, yet also without incorporating excessive moisture in the tape.

The valve 37 is regulated by trial and error for each section of tape 10 to achieve the desired sealing with a minimum of moisture. Thus, the flow of solution 33 is regulated so that the spray device 30 delivers enough to insure sealing of the tape 10 and no more than that (except, perhaps, to provide a small margin of error). Once the correct moisture level is found, it can be retained until a change is indicated.

Using this same method to limit moisture application and comparing the application of my new solution with that of water alone, it has been found that only about one-third as much water is used to get the same sealing effect! This makes it possible to turn the spray valve 37 down a great deal. Moreover, the tape 10 appears to be much dryer after sealing, and there are no problems of tape shrinkage. Nor have there been any problems with the spraying equipment. There has been no clogging of the nozzle 31 or of the metering orifices and valves, nor any gumming in the storage container 34.

Samples of closed seed tape, some of which were sealed by water alone and some of which were sealed by the solution of this invention (1 percent solution used in tests) were placed on a wet blotter. Water was then added to dissolve the tapes. All tapes tested dissolved at about the same rate. In another dissolution test, comparable samples of tape sealed in both ways were dropped on a surface of water at 90° F. Again, there was very little difference in the way or speed at which the two tapes dissolved.

Determinations of seed-tape moisture content have been made for various types of seed. The range of tape moisture contents from the seed tape made by the present invention ran from 3.4 and 6.3 percent, averaging under 5 percent. (It will be recalled that tape sealed by water ranged in moisture content from about 3 to 15 percent, averaging around 6 to 7 percent, with many over 10 percent.)

Substantial improvements in germination rates are confidently expected.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A process of sealing water-soluble polyethylene oxide film upon itself, comprising moistening said film with an aqueous solution consisting essentially of polyethylene oxide in an effective amount, and then pressing the film together upon itself, said process enabling the use of less water than where only water is used for said moistening step and thereby enabling holding the water content within the sealed film at a lower level.

2. A process of sealing water-soluble polyethylene oxide film upon itself, comprising moistening said film with an aqueous solution of polyethylene oxide film in an effective amount, and then pressing said moistened film upon itself, said process enabling a reduction in the amount of water used for sealing than where water alone is used in the moistening step, thereby enabling holding the water content at a lower level within the sealed film.

3. The process of claim 2 wherein said solution is made from scrap polyethylene film substantially identical to that on which said solution is to be applied.

4. A process of sealing water-soluble polyethylene oxide film upon itself, comprising spraying said film with an aqueous solution consisting essentially of polyethylene oxide in an effective amount and with a viscosity enabling spraying, and then pressing the film on itself.

5. A process of sealing water-soluble polyethylene oxide film upon itself, comprising spraying said film with an aqueous solution of polyethylene oxide film in an effective amount and with a viscosity enabling spraying, and then pressing the film upon itself.

6. The process of claim 5 wherein said solution is made from scrap polyethylene film substantially identical to that on which said solution is to be sprayed.

7. A process for making seed tape from water-soluble polyethylene oxide film, comprising the steps of
applying to said film a solution consisting essentially of polyethylene oxide in water in an effective amount at a suitable viscosity,
depositing seeds upon said film at intervals, and
pressing closed said film upon itself and sealing the seeds therein.

8. The process of claim 7 wherein
said solution is applied at the amount approaching the lowest amount capable of insuring sealing, so that the moisture content within the sealed tape is kept low.

9. A process for making seed tape from water-soluble polyethylene oxide film, comprising the steps of
applying to said film a solution of polyethylene oxide film in water in an effective amount at a suitable viscosity,
depositing seeds upon said film at intervals, and
pressing said film upon itself to seal the seeds therein and hold them in position.

10. The process of claim 9 wherein
said solution is applied at the amount approaching the lowest amount capable of insuring sealing, so that the moisture content within the sealed tape is kept low.

11. A process for making seed tape from water-soluble polyethylene oxide film, comprising the steps of
spraying upon said film a solution consisting essentially of polyethylene oxide in water in an effective amount with a viscosity low enough to enable easy spraying,
depositing seeds upon said film at intervals, and
pressing closed said film upon itself and sealing the seeds therein,
said solution being sprayed at the amount approaching the lowest amount capable of insuring sealing, so that the moisture content within the sealed tape is kept low.

12. A process for making seed tape from water-soluble polyethylene oxide film, comprising the steps of
spraying upon said film a solution of polyethylene oxide film in water in an effective amount with a viscosity low enough to enable easy spraying,
depositing seeds upon said film at intervals, and
pressing said film upon itself to seal the seeds therein and hold them in position,
said solution being sprayed at the amount approaching the lowest amount capable of insuring sealing, so that the moisture content within the sealed tape is kept low.

* * * * *